Figure 1:
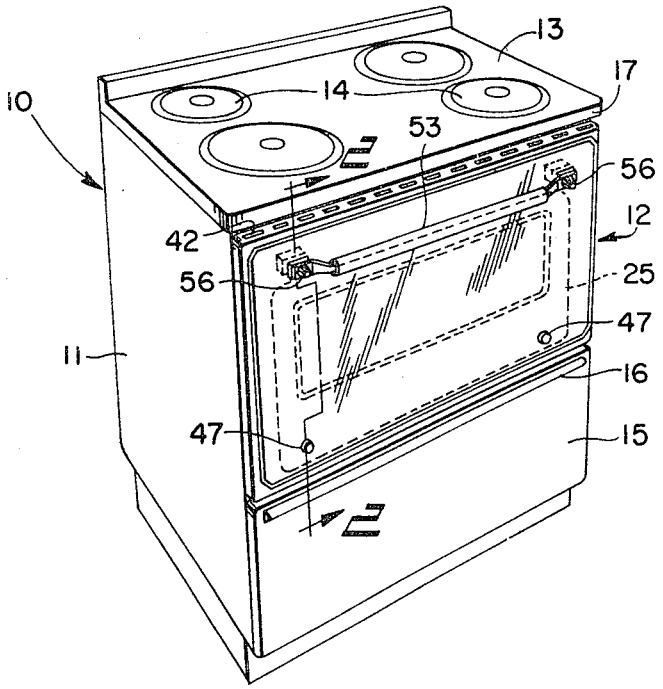
Figure 2:
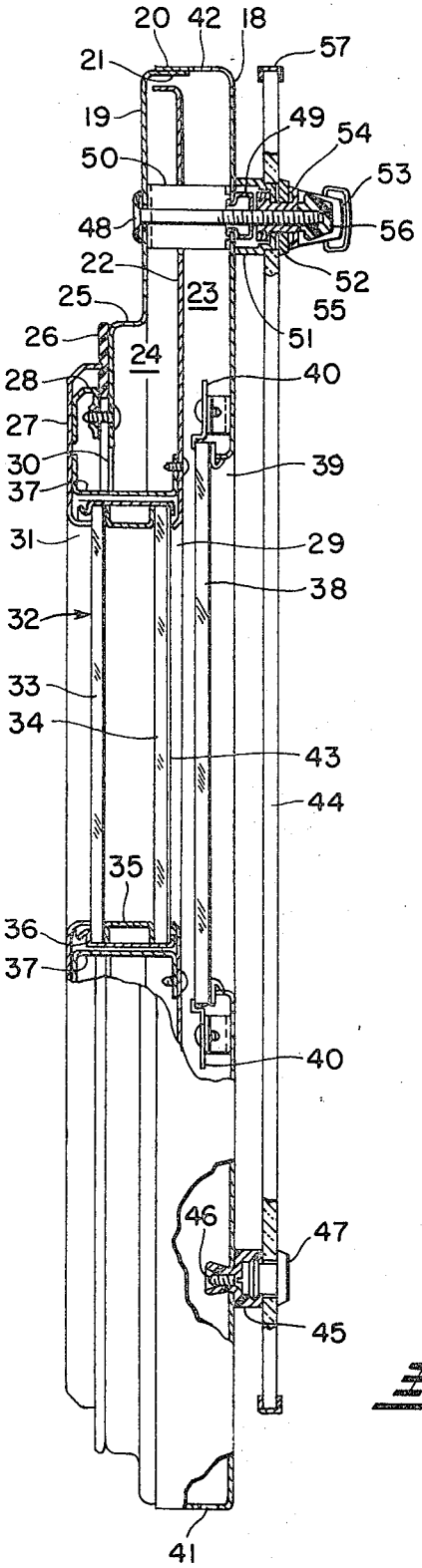
Figure 3:
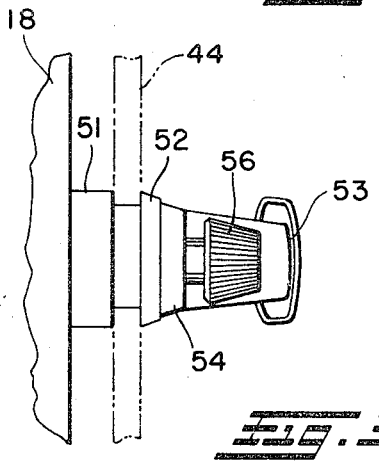

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 18, 1970

877 O.G. 489

T877,004

WINDOWED OVEN DOOR

Richard E. Payne, Mansfield, Ohio, assignor to The Tappan Company, Mansfield, Ohio, a corporation of Ohio

Filed Jan. 16, 1970, Ser. No. 3,332
Int. Cl. F23m *7/00*
U.S. Cl. 126—200
1 Sheet Drawing. 8 Pages Specification

An outer glass plate is mounted removably on the normal front of the oven door in spaced relation and extending over the major area of the same. The mounting involves only negligible contact between the two and in part also attaches the handle to the door, so that air can

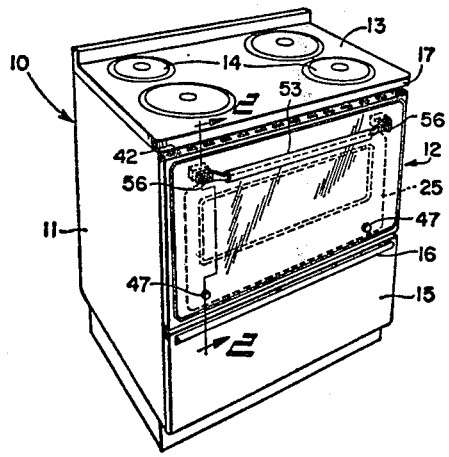

circulate freely behind the outer glass and the handle can be applied to the door without as well as with the glass.

Aug. 18, 1970 R. E. PAYNE T877,004

WINDOWED OVEN DOOR

Filed Jan. 16, 1970

INVENTOR
RICHARD E. PAYNE

BY
Oberlin, Maky, Donnelly & Renner
ATTORNEYS